United States Patent [19]
Yelke

[11] 4,304,126
[45] Dec. 8, 1981

[54] TRANSDUCER FOR FUEL INJECTION ENGINE WITH FLEXIBLE PIEZOELECTRIC ELEMENT

[76] Inventor: Edward Yelke, 945 S. Kensington, LaGrange, Ill. 60525

[21] Appl. No.: 128,571

[22] Filed: Mar. 10, 1980

Related U.S. Application Data

[63] Continuation-in-part of Ser. No. 949,061, Oct. 6, 1978, Pat. No. 4,192,179.

[51] Int. Cl.³ .......................................... G01M 19/00
[52] U.S. Cl. .................................. 73/119 A; 73/754; 310/338
[58] Field of Search ............... 73/119 A, 730, 754, 73/DIG. 4; 310/338, 330, 800, 345, 365

[56] References Cited

U.S. PATENT DOCUMENTS

| | | | |
|---|---|---|---|
| 3,325,780 | 6/1967 | Horan | 310/330 X |
| 4,216,403 | 8/1980 | Krempl et al. | 310/338 |

*Primary Examiner*—Jerry W. Myracle
*Attorney, Agent, or Firm*—Robert E. Wagner; Leo J. Aubel

[57] ABSTRACT

A transducer for sensing and monitoring the injection of fuel into a fuel injection type engine including a transducer comprising a flexible collar of low mass and a flexible piezoelectric element mounted on the fuel line to sense the change in the circumferential dimension of the line due to the surge of pressure created in the line as the fuel is injected through the line into the engine.

2 Claims, 7 Drawing Figures

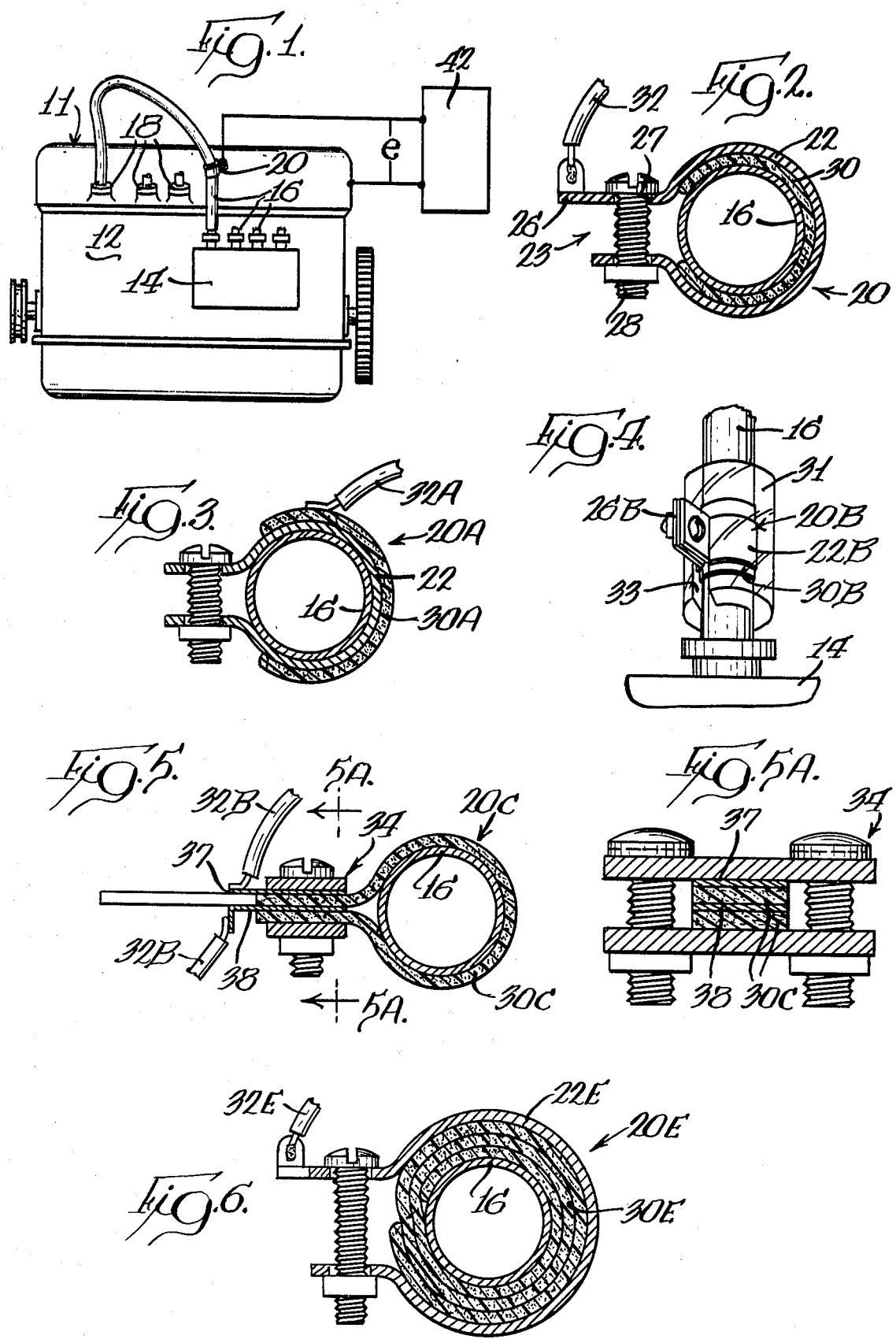

TRANSDUCER FOR FUEL INJECTION ENGINE WITH FLEXIBLE PIEZOELECTRIC ELEMENT

The present invention is a continuation-in-part of U.S. Patent Application Ser. No. 949,061, filed on Oct. 6, 1978, now U.S. Pat. No. 4,192,179 entitled Piezoelectric Transducer for Fuel Injection Engine, in the name of Edward Yelke, the inventor of the present invention. The disclosure of said application Ser. No. 949,061 is specifically incorporated herein by reference.

DESCRIPTION

1. Technical Field

The present invention relates generally to piezoelectric transducers, and more specifically to piezoelectric transducers for sensing the injection of fuel under pressure through a fuel line of an engine in response to the change in the circumferential dimension of the line due to the surge of pressure developed in the line as the fuel is injected into the engine.

2. Background Prior Art

It is a principal object of the present invention to provide a new and improved transducer of the type described in the aforesaid patent application Ser. No. 949,061; and, incorporating a flexible piezoelectric element for monitoring and sensing the charge of fuel applied to a fuel injection engine.

SUMMARY OF THE INVENTION

The inventive transducer is in the form of a flexible collar of low mass with a flexible piezoelectric material positioned in circular configuration on the collar whereby the piezoelectric material converts the expansion of the fuel line, due to the applied fluid pressure, into a voltage which may be coupled out to a suitable electrical circuitry; and whereby the effects of engine and other noise and vibration are minimized to effect a clean sharp signal.

DESCRIPTION OF THE DRAWINGS

FIG. 1 is a sketch of a side elevation of a diesel engine with the inventive pressure transducer shown as mounted on a fuel injection line;

FIG. 2 is a side view of one embodiment of the inventive transducer shown as mounted on a fuel line;

FIG. 3 is a side view of a second embodiment of the inventive transducer as mounted on a fuel line;

FIG. 4 is an isometric view of a third embodiment of the inventive transducer shown as mounted on a fuel line.

FIG. 5 is a side view of another embodiment of the inventive transducer shown as mounted on a fuel line;

FIG. 5A is an end view showing the clamp means of the structure of FIG. 5; and,

FIG. 6 is a side view of yet another embodiment of the inventive transducer shown as mounted on a fuel line.

DETAILED DESCRIPTION

Refer first to FIG. 1, which shows an internal combustion engine of the diesel type represented by the reference numeral 11 and comprising an engine block 12 having a plurality of cylinders. A fuel injection pump housing 14 on the engine block has a number of fuel injection lines 16 connecting through injection nozzles 18 to respective cylinders as is known in the art.

As described in the above referenced patent application Ser. No. 949,061, a pressure transducer 20 is mounted on a fuel injection line 16. The fuel injection lines 16 are formed of metallic tubing of sufficient strength to withstand the high injection pressures utilized in diesel engines. As was described above and as is known, the tubing of line 16 will expand as the fuel under pressure passes through the line and transducer 20 develops an electrical signal responsive to the pressure change effected by fuel injection.

Refer now to FIG. 2 which shows a first embodiment of the inventive pressure transducer 20. The transducer 20 is formed as a split collar or clamp 22 of thin brass or spring steel to provide an assembly of very low mass. Collar 22 includes outwardly extending mating lips or flanges 26 which can be opened as at 23 for mounting onto injection line 16. Flanges 26 have holes 27 for receiving a nut and bolt generally labeled 28, which draw the flanges 26 toward each other to tighten the collar 22 around line 16. A strip of piezoelectric sheet material 30 is adhered such as by adhesive onto the inside surface of the collar 22. The piezoelectric sheet material may be a piezo-film which is a composite of piezoceramic crystals and thermo-plastic high molecular resin or a piezo-rubber composite of piezoceramic crystals and rubber. In the embodiments shown in the drawings a piezo-rubber film was employed.

The metallic collar 22 is an active signal member while the inside surface of the piezoelectric strip 30 is grounded to the injection line 16. The output signal "e" is coupled by a conductive lead 32, such as from flange 26. The contact of the piezoelectric strip 22 substantially completely around the periphery of the line 16, as well as the low mass of collar 22, maximizes the output signal while minimizing noise.

It is quite important that the overall mass of the collar 22 be minimized to minimize noise pickup due to engine vibrations. It is also important to achieve a close effective contact between the transducer assembly comprising the collar 22 and the strip of piezoelectric material 30 with the line 16, preferably along a major portion of the circumferential surface of the line 16, as shown in FIG. 2.

In the embodiment of FIG. 3, the piezoelectric strip 30A is affixed to the external surface of collar 22A. In this embodiment, the signal "e" is coupled through lead 32A from the external surface of piezoelectric strip 30A while the inner surface of strip 30A is grounded through collar 22A to the injection line 16.

FIG. 4 shows a modification of the inventive transducer 20B suitable for mounting at the point of connection of a line 16 with the injection pump housing 14. In this embodiment, a flexible piezoelectric sheet 30B is placed around the line 16 and secured in position by a clamp 22B similarly as in FIG. 2. In addition, a plastic sleeve 31 formed as a cylinder and having a longitudinal cut-out or slot 33 on the side of the cylinder, is closely fitted in position over the transducer 20B to provide mechanical and environmental protection.

During the installation process, sleeve 31 is inserted over the line 16, adjacent the connection of the line to the pump 14; the transducer 20B is mounted in position; and next, the sleeve 31 is pushed downwardly over the transducer with the slot 33 accommodating the outwardly extending flanges 26B on clamp 22B.

FIG. 5 shows another embodiment of the inventive transducer labeled 20C wherein a piezoelectric strip 30C is stretched around line 16. A side clamp assembly 34, (see also FIG. 5A) receives the wrapped around end of the piezoelectric strip 30C. Tension is maintained on the piezoelectric strip 30C by tightening the clamp assembly 34. The electrical signal is coupled through leads 32A and 32B which are connected to metal plates 37 and 38 which are in electrical connect with respective opposite surfaces of the piezoelectric strip 30C.

FIG. 6 shows yet another embodiment of the inventive transducer labeled 20E wherein a flexible plastic piezoelectric film 30E is wound or wrapped around the injection line 16 with one or more turns and the clamp 22E is positioned around the film 30E and tightened such as described with reference to FIGS. 2 and 3. The embodiment of FIG. 6 assures the film 30E encircles or encompasses the tube a full 360° for maximum signal generation. In this latter structure, film 16E, without conductive surfaces, may be used since the signal is generated between the injection line 16 electrical ground reference, and the electrical lead 32E connected to clamp member 22E.

Two known sources for flexible plastic piezo-film which may be a composite of piezoceramic crystals and thermo-plastic high molecular resin or a piezo-rubber composite of piezo-ceramic crystals and rubber are (a) NTK Technical Ceramics Division, NGK Spark Plug Company, Ltd., 14-8 Takatsuji-cho, Mizuko-Ku, Nagoya, Japan; and, (b) Kureha Chemicals Industries, Japan.

As mentioned above, the expansion of line 16 due to pressure induced stress, occurs when fuel is injected therethrough. The foregoing causes a change in mechanical or physical pressure applied to the piezoelectric material 30 which, in turn, converts or transforms the pressure to an electrical potential or signal "e". Signal "e" comprises a waveform having a steeply rising leading edge and steeply falling trailing edge which then dampens to zero. The signal "e" is coupled to suitable electronic circuitry 42 of any suitable known design, as indicated in FIG. 1, to be processed such as to provide timing, RPM, data re volume of fuel injected, and pollution control information.

Importantly, the inventive transducer comprises a flexible piezoelectric material and a flexible collar of low mass for mounting on tubular line for sensing the injection of fluid under pressure through the line. The flexibility is important to permit the collar and piezoelectric material to closely conform to the circumference of the associated line to assure that the piezoelectric material bears against the surface of the line to provide a defined signal. The low mass is important to eliminate the susceptibility to vibration noises to which the prior known transducer has been susceptible. It is quite necessary to decrease the noise response so that the signal "e" is clean, and sharp and hence defined.

While the invention has been particularly shown and described with reference to a preferred embodiment thereof, it will be understood by those skilled in the art that various changes in form and details may be made therein without departing from the spirit and scope of the invention.

I claim:

1. A pressure transducer for sensing the injection of fluid through a tubular line comprising in combination; a housing member of low mass for mounting on the line, said member being formed as a split collar and being flexible to essentially conform to the circumferential contour of the line, securing means for clamping the collar around the line, piezoelectric material of low mass positioned on the outer surface of said collar; said piezoelectric material being flexible; said collar and said piezoelectric material being mountable along a substantial portion of the circumference of said line, whereby said piezoelectric material generates an electrical signal dependent on the pressure exerted on the line by the fluid passing through said line, and the low mass of the collar and the piezoelectric material minimizes the effect of engine vibrations and noise to thereby provide a clean defined signal.

2. A transducer as in claim 1 further including a plastic sleeve slidably positionable around said collar for providing mechanical and environmental protection.

* * * * *